United States Patent [19]
Arkens et al.

[11] Patent Number: 6,136,916
[45] Date of Patent: Oct. 24, 2000

[54] CURABLE AQUEOUS COMPOSITION

[75] Inventors: Charles Thomas Arkens, Hatfield; Robert David Gleim, New Hope, both of Pa.

[73] Assignee: Rohm and Haas Company, Philadelphia, Pa.

[21] Appl. No.: 09/049,541

[22] Filed: Mar. 27, 1998

Related U.S. Application Data

[62] Division of application No. 08/262,281, Jun. 20, 1994, Pat. No. 5,763,524, which is a division of application No. 08/075,715, Jun. 11, 1993, Pat. No. 5,661,213, and a continuation-in-part of application No. 07/926,262, Aug. 6, 1992, abandoned.

[51] Int. Cl.$^7$ ............................................. C08L 31/00
[52] U.S. Cl. ........................ 524/556; 524/386; 524/387; 524/388; 524/549; 524/557; 524/558
[58] Field of Search ............................ 524/388, 556, 524/557, 558, 386, 387, 549

[56] References Cited

U.S. PATENT DOCUMENTS

| | | | |
|---|---|---|---|
| 2,789,099 | 4/1957 | Rife et al. | 260/29.6 |
| 4,076,917 | 2/1978 | Swift et al. | 526/49 |
| 4,579,676 | 4/1986 | Bull | 252/94 |
| 4,774,303 | 9/1988 | Denzinger et al. | 526/212 |
| 4,846,993 | 7/1989 | Lentsch et al. | 252/95 |
| 4,847,070 | 7/1989 | Pyrz et al. | 424/52 |
| 4,936,865 | 6/1990 | Welch et al. | 8/120 |
| 5,143,582 | 9/1992 | Arkens et al. | 162/135 |
| 5,143,719 | 9/1992 | Elliott et al. | 424/52 |
| 5,185,411 | 2/1993 | Jueptner et al. | 526/200 |
| 5,318,990 | 6/1994 | Strauss | 524/549 |
| 5,340,868 | 8/1994 | Strauss et al. | 524/461 |

FOREIGN PATENT DOCUMENTS

WO96/15075  10/1995  WIPO.

*Primary Examiner*—Judy M. Reddick
*Attorney, Agent, or Firm*—Ronald D. Bakule

[57] ABSTRACT

This invention relates to a formaldehyde-free curable aqueous composition containing a polyacid, a polyol and a phosphorous-containing accelerator. The composition may be used as a binder for heat resistant nonwovens such as nonwovens composed of fiberglass.

4 Claims, No Drawings

CURABLE AQUEOUS COMPOSITION

This application is a Division of U.S. Ser. No. 08/262,281 filed Jun. 20, 1994, now U.S. Pat. No. 5,763,524, which is a Division of U.S. Ser. No. 08/075,715 filed Jun. 11, 1993, now U.S. Pat. No. 5,661,213, which is a Continuation-in-part of U.S. Ser. No. 07/926,262 filed Aug. 6, 1992, now abandoned.

FIELD OF THE INVENTION

This invention relates to a formaldehyde-free curable aqueous composition and the use thereof as a binder for heat-resistant nonwovens. The composition contains (a) a polyacid containing at least two carboxylic acid groups, anhydride groups, or the salts thereof; (b) a polyol containing at least two hydroxyl groups; and (c) a phosphorous-containing accelerator, wherein the ratio of the number of equivalents of said carboxylic acid groups, anhydride groups, or salts thereof to the number of equivalents of said hydroxyl groups is from about 1/0.01 to about 1/3, and wherein the carboxyl groups, anhydride groups, or salts thereof are neutralized to an extent of less than about 35% with a fixed base. The composition may be used as a binder for nonwovens composed of fiberglass or other heat-resistant fibers.

BACKGROUND OF THE INVENTION

Nonwoven fabrics are composed of fibers which may be consolidated by purely mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Some nonwoven fabrics are used at temperatures substantially higher than ambient temperature such as, for example, glass fiber-containing nonwoven fabrics which are impregnated with a hot asphaltic composition pursuant to making roofing shingles or roll roofing material. When a nonwoven fabric is contacted with a hot asphaltic composition at temperatures of 150–250° C., the nonwoven fabric may sag, shrink, or otherwise become distorted. Therefore, nonwoven fabrics which incorporate a curable aqueous composition should substantially retain the properties contributed by the cured aqueous composition such as, for example, tensile strength. In addition, the cured composition should not substantially detract from essential nonwoven fabric characteristics, as would be the case, for example, if the cured composition were too rigid or brittle or became sticky under processing conditions.

There is a need for a method for making a heat-resistant nonwoven fabric by using heat-resistant fibers and a heat-resistant curable aqueous composition which is free of formaldehyde, because of existing and proposed legislation directed to the lowering or elimination of formaldehyde.

DESCRIPTION OF THE PRIOR ART

U.S. Pat. No. 4,693,847 discloses the esterification of a rosin, which is mainly a mixture of $C_{20}$, fused-ring, monocarboxylic acids, with a polyol in the presence of a catalytic proportion of an organic ester of hypophosphorous acid, such as 2-ethylhexyl phosphinic acid.

U.S. Pat. No. 4,658,003 discloses (hydroxy)-phosphinylalkyl (meth)acrylates which can be prepared by the reaction of hypophosphorous acid with a suitable aldehyde or ketone to prepare an a-hydroxyalkyl phosphorous acid, which is thereafter reacted with acrylic or methacrylic acid to prepare the (meth)acrylates, which may be further homo- or co-polymerized.

U.S. Pat. No. 5,042,986 discloses an aqueous treating solution for cellulosic textiles, the treating solution containing a cyclic aliphatic hydrocarbon of 4 to 6 carbon atoms having 4 or more carboxyl groups wherein at least two adjacent carboxyl groups are in the trans configuration relative to each other. The treating solution includes a suitable curing agent which is the alkali metal dihydrogen phosphate or the alkali metal salt of phosphorous, hypophosphorous, and polyphosphoric acid. The treating process is disclosed to be advantageously used with textiles containing 30–100% cellulosic materials.

U.S. Pat. Nos. 4,820,307; 4,936,865; and 4,975,209 disclose catalysts for the rapid formaldehyde-free esterification and crosslinking of fibrous cellulose in textile form by polycarboxylic acids including saturated, unsaturated, and aromatic acids as well as alpha-hydroxyacids. The catalysts disclosed are acidic or weakly basic salts selected from the alkali metal dihydrogen phosphates and alkali metal salts of phosphorous, hypophosphorous, and polyphosphoric acids.

U.S. Pat. No. 4,795,533 discloses a solid electrolyte membrane which contains a three component blend prepared by admixing an organic polymer, such as polyvinyl alcohol, with an inorganic compound and a polyorganic acid, such as polyacrylic acid. The inorganic compound is disclosed to be selected from a group consisting of phosphoric acid, sulphuric acid, heteropoly acids, or salts of heteropoly acids. Examples of phosphoric acids which may be employed include hypophosphoric acid, metaphosphoric acid, orthophosphoric acid, pyrophosphoric acid, and polyphosphoric acid.

U.S. Pat. No. 4.076,917 discloses β-hydroxyalkylamides and certain polymers thereof as curing agents for polymers containing one or more carboxy or anhydride functions. The β-hydroxyamides are disclosed to be effective in solution, aqueous emulsion, and powder coating form.

None of the references disclose a formaldehyde-free curable aqueous composition and the use thereof as a binder for heat-resistant nonwovens. The composition contains (a) a polyacid containing at least two carboxylic acid groups, anhydride groups, or the salts thereof; (b) a polyol containing at least two hydroxyl groups; and (c) a phosphorous-containing accelerator, wherein the ratio of the number of equivalents of said carboxylic acid groups, anhydride groups, or salts thereof to the number of equivalents of said hydroxyl groups is from about 1/0.01 to about 1/3, and wherein the carboxyl groups, anhydride groups, or salts thereof are neutralized to an extent of less than about 35% with a fixed base.

SUMMARY OF THE INVENTION

A formaldehyde-free curable aqueous composition and the use thereof as a binder for heat-resistant nonwovens such as, for example, nonwovens composed of fiberglass or other heat-resistant fibers are provided. The composition contains (a) a polyacid containing at least two carboxylic acid groups, anhydride groups, or salts thereof; (b) a polyol containing at least two hydroxyl groups; and (c) a phosphorous-containing accelerator.

DETAILED DESCRIPTION OF THE INVENTION

This invention is directed to a formaldehyde-free curable aqueous composition and the use thereof as a binder for heat-resistant nonwovens. The composition contains (a) a polyacid containing at least two carboxylic acid groups, anhydride groups, or salts thereof; (b) a polyol containing at least two hydroxyl groups; and (c) a phosphorous-containing accelerator, wherein the ratio of the number of equivalents of said carboxylic acid groups, anhydride groups, or salts thereof to the number of equivalents of said hydroxyl groups is from about 1/0.01 to about 1/3, and wherein the carboxyl groups are neutralized to an extent of less than about 35% with a fixed base. The composition may be used as a binder for heat-resistant nonwovens such as, for example, nonwovens composed of fiberglass.

The formaldehyde-free curable aqueous composition of this invention is a substantially thermoplastic, or substantially uncrosslinked, composition when it is applied to the substrate, although low levels of deliberate or adventitious crosslinking may be present. On heating the binder, the binder is dried and curing is effected, either sequentially or concurrently. By curing is meant herein a structural or morphological change which is sufficient to alter the properties of a flexible, porous substrate to which an effective amount of polymeric binder has been applied such as, for example, covalent chemical reaction, ionic interaction or clustering, improved adhesion to the substrate, phase transformation or inversion, hydrogen bonding, and the like.

This invention is directed to a formaldehyde-free curable aqueous composition. By "formaldehyde-free composition" herein is meant that the composition is substantially free from formaldehyde, nor does it liberate substantial formaldehyde as a result of drying and/or curing. In order to minimize the formaldehyde content of the waterborne composition it is preferred, when preparing a polymer-containing formaldehyde-free curable aqueous composition, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of heat-resistant nonwovens. By "substantially free from formaldehyde" herein is meant that when low levels of formaldehyde are acceptable in the waterborne composition or when compelling reasons exist for using adjuncts which generate or emit formaldehyde, substantially formaldehyde-free waterborne compositions may be used.

The formaldehyde-free curable aqueous composition contains a polyacid. The polyacid must be sufficiently nonvolatile that it will substantially remain available for reaction with the polyol in the composition during heating and curing operations. The polyacid may be a compound with a molecular weight less than about 1000 bearing at least two carboxylic acid groups, anhydride groups, or salts thereof such as, for example, citric acid, butane tricarboxylic acid, and cyclobutane tetracarboxylic acid or may be a polymeric polyacid such as, for example, a polyester containing at least two carboxylic acid groups and an addition polymer or oligomer containing at least two copolymerized carboxylic acid-functional monomers. The polymeric polyacid is preferably an addition polymer formed from at least one ethylenically unsaturated monomer. The addition polymer may be in the form of a solution of the addition polymer in an aqueous medium such as, for example, an alkali-soluble resin which has been solubilized in a basic medium; in the form of an aqueous dispersion such as, for example, an emulsion-polymerized dispersion; or in the form of an aqueous suspension. "Aqueous" herein includes water and mixtures composed substantially of water and water-miscible solvents.

The addition polymer must contain at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, $\alpha,\beta$-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like.

The addition polymer containing at least two carboxylic acid groups, anhydride groups, or salts thereof may have a molecular weight from about 300 to about 10,000,000. Preferred is a molecular weight from about 1000 to about 250,000. When the addition polymer is an alkali-soluble resin having a carboxylic acid, anhydride, or salt thereof, content of from about 5% to about 30%, by weight based on the total weight of the addition polymer, a molecular weight from about 10,000 to about 100,000 is preferred, higher molecular weight alkali-soluble resins leading to curable compositions which exhibit excessive viscosity.

When the addition polymer is in the form of an aqueous dispersion or an aqueous suspension and low levels of precrosslinking or gel content are desired, low levels of multi-ethylenically unsaturated monomers such as, for example, allyl methacrylate, diallyl phthalate, 1,4-butylene glycol dimethacrylate, 1,6-hexanedioldiacrylate, and the like, may be used at a level of from about 0.01% to about 5%, by weight based on the weight of the acrylic emulsion copolymer.

When the addition polymer is in the form of an aqueous dispersion the diameter of the addition polymer particles may be from about 80 nanometers to about 1000 nanometers, as measured using a Brookhaven BI-90 Particle Sizer, which employs a light scattering technique. However, polymodal particle size distributions such as those disclosed in U.S. Pat. Nos. 4,384,056 and 4,539,361, hereby incorporated herein by reference, may be employed.

When the addition polymer is in the form of an aqueous dispersion the addition polymer particles may be made up of two or more mutually incompatible copolymers. These mutually incompatible copolymers may be present in various morphological configurations such as, for example, core/shell particles, core/shell particles with shell phases incompletely encapsulating the core, core/shell particles with a multiplicity of cores, interpenetrating network particles, and the like.

The addition polymer may be prepared by solution polymerization, emulsion polymerization, or suspension polymerization techniques for polymerizing ethylenically-unsaturated monomers which are well known in the art. When it is desired to use emulsion polymerization, anionic or nonionic surfactants, or mixtures thereof, may be used. The polymerization may be carried out by various means such as, for example, with all of the monomer in the reaction kettle at the beginning of the polymerization reaction, with a portion of the monomer in emulsified form present in the reaction kettle at the beginning of the polymerization reaction, and with a small particle size emulsion polymer seed present in the reaction kettle at the beginning of the polymerization reaction.

The polymerization reaction to prepare the addition polymer may be initiated by various methods known in the art such as, for example, by using the thermal decomposition of an initiator and by using an oxidation-reduction reaction ("redox reaction") to generate free radicals to effect the polymerization. In another embodiment the addition polymer may be formed in the presence of phosphorous-containing chain transfer agents such as, for example, hypophosphorous acid and its salts, as is disclosed in U.S. Pat. No. 5,077,361, which is hereby incorporated herein by reference, so as to incorporate the phosphorous-containing accelerator and the polyacid component in the same molecule.

Chain transfer agents such as mercaptans, polymercaptans, and halogen compounds may be used in the polymerization mixture in order to moderate the molecular weight of the acrylic emulsion copolymer. Generally, from 0% to about 1% by weight, based on the weight of the polymeric binder, of $C_4$–$C_{20}$ alkyl mercaptans, mercaptopropionic acid, or esters of mercaptopropionic acid, may be used.

The carboxyl groups of the polyacid component of the formaldehyde-free curable aqueous composition are neutralized with fixed base to an extent of less than about 35%, calculated on an equivalents basis. Contacting the addition polymer component before, during, or after the preparation of the curable aqueous composition, the addition polymer containing two carboxylic acid groups, anhydride groups, or the salts thereof, defined as neutralization herein, with a fixed base is required prior to treating a nonwoven substrate. Neutralization of less than about 35% of the carboxylic acid groups, calculated on an equivalents basis, with a fixed base is required. Neutralization of less than about 20% of the carboxylic acid groups, calculated on an equivalents basis, with a fixed base is preferred. Neutralization of less than about 5% of the carboxylic acid groups, calculated on an equivalents basis, with a fixed base is more preferred. When the half ester of a dicarboxylic acid or the anhydride of a dicarboxylic acid is used, the equivalents of acid are calculated to be equal to those of the corresponding dicarboxylic acid.

"Fixed base", or "permanent base", as used herein, refers to a monovalent base which is substantially non-volatile under the conditions of the treatment such as, for example, sodium hydroxide, potassium hydroxide, sodium carbonate, or t-butylammonium hydroxide. The fixed base must be sufficiently nonvolatile that it will substantially remain in the composition during heating and curing operations. Volatile bases such as, for example, ammonia or volatile lower alkyl amines, do not function as the fixed base of this invention, but may be used in addition to the fixed base; they do not contribute to the required degree of neutralization by a fixed base. Fixed multivalent bases such as, for example, calcium carbonate may tend to destabilize an aqueous dispersion, if the addition polymer is used in the form of an aqueous dispersion, but may be used in minor amount.

The formaldehyde-free curable aqueous composition also contains a polyol containing at least two hydroxyl groups. The polyol must be sufficiently nonvolatile that it will substantially remain available for reaction with the polyacid in the composition during heating and curing operations.

The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis-[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl (meth)acrylate, hydroxypropyl (meth) acrylate, and the like.

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.2 to about 1/1. The most preferred ratio of the number of equivalents of carboxy, anhydride, or salts thereof in the polyacid to the number of equivalents of hydroxyl in the polyol is from about 1/0.2 to about 1/0.8.

The formaldehyde-free curable aqueous composition also contains a phosphorous-containing accelerator which may be a compound with a molecular weight less than about 1000 such as, for example, an alkali metal hypophosphite salt, an alkali metal phosphite, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. Preferred is a level of phosphorous-containing accelerator of from about 2.5% to about 10%, by weight based on the combined weight of the polyacid and the polyol.

The formaldehyde-free curable aqueous composition may contain, in addition, conventional treatment components such as, for example, emulsifiers, pigments, fillers, anti-migration aids, curing agents, coalescents, wetting agents, biocides, plasticizers, organosilanes, anti-foaming agents, colorants, waxes, and anti-oxidants.

The formaldehyde-free curable aqueous composition may be prepared by admixing the polyacid, the polyol, and the phosphorous-containing accelerator using conventional mixing techniques. In another embodiment a carboxyl- or anhydride-containing addition polymer and a polyol may be present in the same addition polymer, which addition polymer would contain both carboxyl, anhydride, or salts thereof functionality and hydroxyl functionality. In another embodiment the salts of the carboxy-group are salts of functional alkanolamines with at least two hydroxyl groups such as, for example, diethanolamine, triethanolamine, dipropanolamine, and di-isopropanolamine. In an additional embodiment the polyol and the phosphorous-containing accelerator may be present in the same addition polymer, which addition polymer may be mixed with a polyacid. In yet another embodiment the carboxyl- or anhydride-containing addition polymer, the polyol, and the phosphorous-containing accelerator may be present in the same addition polymer. Other embodiments will be apparent to one skilled in the art. As disclosed herein-above, the carboxyl groups of the polyacid may be neutralized to to an extent of less than about 35% with a fixed base before, during, or after the mixing to provide the aqueous composition. Neutralization may be partially effected during the formation of the polyacid.

In one embodiment of this invention the formaldehyde-free curable aqueous composition may contain a highly reactive polyol without a phosphorous-containing accelerator. Polyols sufficiently reactive to permit the omission of a phosphorous-containing accelerator may be used in the composition which contains (a) a polyacid containing at least two carboxylic acid groups, anhydride groups, or the salts thereof and (b) a highly reactive polyol containing at least two hydroxyl groups; wherein the ratio of the number of equivalents of said carboxylic acid groups, anhydride groups, or salts thereof to the number of equivalents of said hydroxyl groups is from about 1/0.01 to about ⅓, and wherein the carboxyl groups, anhydride groups, or salts thereof are neutralized to an extent of less than about 30% with a fixed base. The composition may be used as a binder for nonwovens composed of fiberglass or other heat-resistant fibers and preferably includes a highly reactive polyol such as, for example, a β-hydroxyalkylamide of the formula:

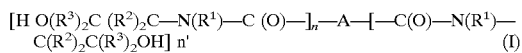

wherein A is a bond, hydrogen or a monovalent or polyvalent organic radical derived from a saturated or unsaturated alkyl radical wherein the alkyl radical contains from 1–60 carbon atoms, such as methyl, ethyl, propyl, butyl, pentyl, hexyl, heptyl, octyl, nonyl, decyl, eicosyl, triacontyl, tetracontyl, pentacontyl, hexylcontyl and the like; aryl, for example, mono- and dinuclear aryl such as phenyl, naphthyl and the like; tri-lower alkyleneamino such as trimethyleneamino, triethyleneamino and the like; or an unsaturated radical containing one or more ethylenic groups [>C═C<] such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1–5 carbon atoms such as methyl, ethyl, n-propyl, n-butyl, sec-butyl, tert-butyl, pentyl and the like or hydroxy lower alkyl of from 1–5 carbon atoms such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1–5 carbon atoms or one of the $R^2$ and one of the $R^3$ radicals may be joined to form, together with the carbon atoms, such as cyclopentenyl, cyclohexyl and the like; n is an integer having a value of 1 or 2 and n' is an integer having a value of 0 to 2 or when n' is 0, a polymer or copolymer (i.e., n has a value greater than 1 preferably 2–10) formed from the β-hydroxyalkylamide when A is an unsaturated radical.

Preferred reactive polyols are those of the foregoing Formula (I), wherein $R^1$ is H, lower alkyl, or $HO(R^3)_2C(R^2)_2C$—, n and n' are each 1, —A— is —$(CH_2)$m is 0–8, preferably 2–8, each case is H and the other is H or a $C_1$–C5 alkyl; that is,

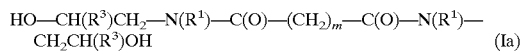

wherein $R^1$, $R^3$, and m have the meanings just given.

Examples of the most preferred reactive polyols fall within the formula:

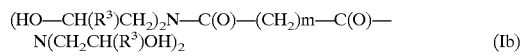

wherein $R^3$ is limited to H in both cases or —$CH_3$ in both cases.

Specific examples falling within Formula Ib are bis[N,N-di(β-hydroxyethyl)] adipamide, bis[N,N-di(β-hydroxypropyl)] azelamide, bis[N-N-di(β-hydroxypropyl)] adipamide, bis[N-N-di(β-hydroxypropyl)] glutaramide, bis[N-N-di(β-hydroxypropyl)] succinamide, and bis[N-methyl-N-(β-hydroxyethyl)] oxamide.

In one embodiment of this invention the formaldehyde-free curable aqueous composition may be used as a binder for heat-resistant nonwoven fabrics such as, for example, nonwovens which contain heat-resistant fibers such as, for example, aramid fibers, ceramic fibers, metal fibers, carbon fibers, polyimide fibers, certain polyester fibers, rayon fibers, and glass fibers. By "heat-resistant fibers" herein is meant fibers which are substantially unaffected by exposure to temperatures above about 125° C. Heat-resistant nonwovens may also contain fibers which are not in themselves heat-resistant such as, for example, certain polyester fibers, rayon fibers, nylon fibers, and superabsorbent fibers, in so far as they do not materially adversely affect the performance of the substrate.

The formaldehyde-free curable aqueous composition may be applied to a nonwoven by conventional techniques such as, for example, air or airless spraying, padding, saturating, roll coating, curtain coating, beater deposition, coagulation, or the like.

The waterborne formaldehyde-free composition, after it is applied to a nonwoven, is heated to effect drying and curing. The duration and temperature of heating will affect the rate of drying, processability and handleability, and property development of the treated substrate. Heat treatment at about 120 C. to about 400 C. for a period of time between about 3 seconds to about 15 minutes may be carried out; treatment at about 150 C. to about 200 C. is preferred. The drying and curing functions may be effected in two or more distinct steps, if desired. For example, the composition may be first heated at a temperature and for a time sufficient to substantially dry but not to substantially cure the composition and then heated for a second time at a higher temperature and/or for a longer period of time to effect curing. Such a procedure, referred to as "B-staging", may be used to provide binder-treated nonwoven, for example, in roll form, which may at a later stage be cured, with or without forming or molding into a particular configuration, concurrent with the curing process.

The heat-resistant nonwovens may be used for applications such as, for example, insulation batts or rolls, as reinforcing mat for roofing or flooring applications, as roving, as microglass-based substrate for printed circuit boards or battery separators, as filter stock, as tape stock, and as reinforcement scrim in cementitious and non-cementitious coatings for masonry.

The following examples are intended to illustrate the formaldehyde-free curable aqueous composition and the use thereof as a binder for heat-resistant nonwovens. They are not intended to limit the invention as other applications of the invention will be obvious to those of ordinary skill in the art.

EXAMPLE 1
Preparation of Curable Aqueous Composition
Preparation of Sample 1

To 178.94 grams of polyacrylic acid (M.W.=60,000) was addded 11.44 grams glycerol, 5.62 grams of sodium hypophosphite monohydrate and 4.0 grams of water. The pH of the mixture was 2.1 and the viscosity was 208 centipoises (measured on a Brookfield LVF viscometer, #4 spindle at 100 rpm). The active ingredients were 30.9% (active ingredients are all components other than water).

Sample 1 is a curable aqueous composition of this invention.

EXAMPLE 2
Preparation of Other Curable Aqueous Compositions
Preparation of Samples 2–5 and Comparative Samples A–B Samples 2–5 and Comparative Samples A-B were prepared according to Sample 1 with the amounts of ingredients as given in Table 2.1.

TABLE 2.1

Preparation of curable aqueous compositions.

| Sample | Grams of Polyacid | Grams of Polyol | Grams of Accel. | $H_2O$ |
|---|---|---|---|---|
| 2 | 100 polyacrylic acid[1] | 40.6 HEA[2] | 4.13 SHP[3] | 60.6 |
| 3 | 125 polyacrylic acid[4] | 15.3 PE[5] | 9.8 SHP[3] | 512.3 |
| 4 | 140 polyacrylic acid[6] | 49.3 HEA[2] | 5.5 SHP[3] | 81.7[7] |
| 5 | 160 p(AA/MA/SHP)[10] | 124.8 HEA[2] | See [10] | 266.9 |
| Comp. A | 92.6 polyacrylic acid[1] | None | None | 43.6 |
| Comp. B | 146.5 polyacrylic acid[8] | 35 HEA[2] | 5.4 SHP[3] | 83.2[9] |

[1]polyacrylic acid of M.W. = 60,000 at 25% solids
[2]bis-[N,N-di(β-hydroxyethyl)adipamide at 40% solids
[3]sodium hypophosphite monohydrate
[4]polyacrylic acid of M.W. = 40,000 at 35% solids
[5]pentaerythritol
[6]polyacrylic acid of M.W. = 60,000; neutralized to 20% with sodium hydroxide; at 26.3% solids
[7]29.6 grams epoxy-functional silane (1% active) was also added
[8]polyacrylic acid of M.W. = 60,000; neutralized to 40% with sodium hydroxide; at 27.5% solids
[9]29.9 grams epoxy-functional silane (1% active) was also added
[10]A copolymer of 57 parts acrylic acid and 25.7 parts of maleic acid prepared in the presence of 17.3 parts of sodium hypophosphite (45% solids)

Samples 2–5 of this invention were prepared. Comparative A contains a polyacid but does not contain a polyol or a phosphorous-containing accelerator. Comparative B is neutralized to an extent of greater than about 30% with a fixed base.

EXAMPLE 3
Treatment of a Heat-Resistant Nonwovens and Tensile Testing of Treated Nonwovens Fiberglass nonwoven substrate was prepared on an inclined-wire Fourdriner (typical glass fiber mat forming machine) pilot line. Fiberglass fiber at 1.25 inches in length (Owens Corning Fiberglas 685-M fiber) was used. The glass fiber was dispersed with 14 ppm. cationic dispersant (KATAPOL VP-532; GAF Chemical Corp.) and 31 ppm. polyacrylamide thickener (Nalco 2386). The mat basis weight prepared was 1.75 lb./100 sq. ft. In the laboratory the continuous sheet was cut into 7 inch by 11 inch sheets which were placed in a 600 C. muffle furnace to burn off any binder and residual organic materials. Sample 1, to which 0.5 wt. % (weight based on weight of binder solids) epoxide functional-aminosilane had been added, was then applied to the sheet, excess binder vacuumed off, and the treated sheet dried and cured in a Mathis oven, for 3 minutes at 200 C. The binder add-on was 28% (dry binder weight based on the weight of glass).

The cured sheet was then cut into 1 inch by 4 inch strips. Strips were tested for dry tensile strength by placing them in the jaws of a Thwing-Albert Intelect 500 tensile tester. Samples were pulled apart at a crosshead speed of 2 inches/minute. Wet tensile strength was measured by soaking a second set of identically prepared cured sheet strips. The samples were soaked in 85 C. water for 1 hour. The samples were removed from the water and tested immediately for tensile strength while still wet.

Wet tensile strength of a curable aqueous composition-treated nonwoven which is a substantial fraction of dry tensile strength of a similarly treated nonwoven is taken herein to indicate that a composition has cured, and that useful high temperature performance of the cured aqueous composition-treated nonwoven results.

The test results for Samples 1–5 and Comparatives A–B were obtained as above except that Sample 3 was applied to a microglass substrate (Whatman 934-AH) and are presented in Table 3.1.

TABLE 3.1

Tensile Testing of Treated Nonwovens.

| Sample | Dry Tensile Strength (lb./in.) | Wet Tensile Strength (lb./in.) |
|---|---|---|
| 1 | 35 | 20 |
| 2 | 25.8 | 21.1 |
| 3 | 13.2 | 9.2 |
| 4 | 28.0 | 18.2 |
| 5 | 26 | 13.2 |
| Comp. A | 30.2 | 2.0 |
| Comp. B | 29.5 | 4.7 |

EXAMPLE 4
Effect of Accelerator Level on Performance of Curable Aqueous Composition-Treated Fiberglass Nonwovens Samples 6–9 and Comparative C were prepared as follows. To a mixture of 100 grams of polyacrylic acid (neutralized to an extent of 3% with fixed base) and 25.6 grams of glycerol was added various amounts of sodium hypophosphite (SHP) monohydrate as indicated in Table 4.1. These aqueous compositions were applied to a microglass substrate (Whatman 934-AH) and tested according to the method of Example 3. Results are presented in Table 4.1.

TABLE 4.1

Effect of accelerator level

| | | Tensile Strength (lb./in.) | |
|---|---|---|---|
| Sample | Weight % SHP | Dry | Wet |
| 6 | 12.5 | 13.9 | 11.4 |
| 7 | 8.3 | 16.1 | 11.7 |
| 8 | 4.2 | 12.8 | 10.5 |
| 9 | 2.1 | 16.4 | 8.5 |
| Comp. C | 0 | 13.1 | 0.5 |

Samples 6–9 of this invention exhibit a substantial retention of tensile strength in the wet tensile strength test. Comparative C which contains a polyacid and a polyol but which does not contain a phosphorous-containing accelerator exhibits essentially no tensile strength when wet.

EXAMPLE 5. Effect of accelerator composition on performance of curable aqueous composition-treated fiberglass nonwovens.

To a mixture of 168.6 grams of polyacrylic acid (at 25% solids; neutralized to an extent of 3% with fixed base) and 23.5 g. of bis-[N,N-di($\beta$-hydroxyethyl)adipamide (at 40% solids) were added 4.32 g. of various accelerators as indicated in Table 5.1. These aqueous compositions were applied to fiberglass nonwovens and tested according to the method of Example 3. Results are presented in Table 5.1.

TABLE 5.1

Effect of accelerator composition

| | | Tensile Strength (lb./in.) | |
|---|---|---|---|
| Sample | Acceleralor | Dry | Wet |
| 10 | sodium hypophosphite | 32.7 | 22.7 |
| 11 | phosphoric acid | 36.4 | 9.7 |
| 12 | phosphorous acid | 35.4 | 20.6 |
| 13 | sodium dihydrogen phosphate | 39.1 | 16.5 |
| Comp. D | p-toluene sulfonic acid | 42.5 | 0.8 |
| Comp. E | disodium hydrogen phosphate | 33.1 | 0.3 |

EXAMPLE 6

Effect of Extent of Neutralization on Performance of Curable Aqueous Composition-Treated Fiberglass Nonwovens—Curable Composition Containing a Reactive Polyol and No Accelerator A mixture of 100 grams of polyacrylic acid (M.W.=60,000; at 25% which had been neutralized to an extent of 2% with a fixed base during synthesis of the polyacid, and 41.7 g. of bis-[N,N-di($\beta$-hydroxyethyl)adipamide (at 40% solids) was adjusted to different extents of neutralization (calculated as equivalents of acid neutralized relative to total equivalents of acid) with sodium hydroxide, a fixed base, as indicated in Table 6.1. These aqueous compositions were applied to fiberglass nonwovens and tested according to the method of Example 3. Results are presented in Table 6.1.

TABLE 6.1

Effect of extent of neutralization

| | | Tensile Strength (lb./in.) | |
|---|---|---|---|
| Sample | % Neutralization | Dry | Wet |
| 14 | 2 | 36 | 19 |
| 15 | 12 | 37 | 15 |
| 16 | 22 | 38 | 10 |
| 17 | 32 | 39 | 5 |
| Comp. F | 42 | 38 | 1 |
| Comp. G | 52 | 34 | 0 |

Samples 14–17 of this invention which incorporate a reactive polyol exhibit a high level of wet tensile strength retention while Comparative F and Comparative G at higher extents of neutralization do not.

EXAMPLE 7

Effect of Extent of Neutralization on Performance of Curable Aqueous Composition-Treated Fiberglass Nonwovens To a mixture of 100 grams of polyacrylic acid (M.W.=60,000; at 25% solids), which had been neutralized to an extent of 2% with a fixed base during synthesis of the polyacid, and 41.7 g. of bis-[N,N-di($\beta$-hydroxyethyl) adipamide was added 4.17 g. of sodium hypophosphite monohydrate and the composition was adjusted to different extents of neutralization (calculated as equivalents of acid neutralized relative to total equivalents of acid) with sodium hydroxide, a fixed base, as indicated in Table 7.1. These aqueous compositions were applied to fiberglass nonwovens and tested according to the method of Example 3. Results are presented in Table 7.1.

TABLE 7.1

Effect of extent of neutralization

| | | Tensile Strength (lb./in.) | |
|---|---|---|---|
| Sample | % Neutralization | Dry | Wet |
| 18 | 2 | 29.8 | 19.9 |
| 19 | 12 | 32.1 | 18.1 |
| 20 | 22 | 28.0 | 18.2 |
| 21 | 32 | 26.8 | 11.2 |
| Comp. H | 42 | 29.5 | 4.7 |
| Comp. I | 52 | 28.9 | 5.1 |

Samples 18–21 of this invention exhibit a high level of wet tensile strength retention while Comparative H and Comparative I at higher extents of neutralization do not.

EXAMPLE 8

Effect of Heating Time/Temperature on Performance of Curable Aqueous Composition-Treated Fiberglass Nonwovens To a mixture of 100 grams of polyacrylic acid (M.W.=60,000; at 25% solids; neutralized to an extent of 3% with fixed base) and 41.7 g. of bis-[N,N-di($\beta$-hydroxyethyl) adipamide (at 40% solids) was added 4.17 g. of sodium hypophosphite monohydrate. This aqueous composition was applied to fiberglass nonwovens and tested according to the method of Example 3. Results are presented in Table 8.1.

TABLE 8.1

Effect of heating time/temperature

| | | Tensile Strength (lb./in.) | |
|---|---|---|---|
| Temperature (°C.) | Time (min.) | Dry | Wet |
| 140 | 1 | 30.4 | 0 |
| 140 | 2 | 32.5 | 1.5 |
| 140 | 3 | 35.0 | 1.5 |
| 140 | 4 | 43.4 | 1.5 |
| 160 | 1 | 30.8 | 1.2 |
| 160 | 2 | 36.3 | 8.5 |
| 160 | 3 | 44.6 | 19.6 |
| 160 | 4 | 40.8 | 23.9 |
| 180 | 1 | 43.3 | 10.9 |
| 180 | 2 | 37.5 | 25.7 |
| 180 | 3 | 32.9 | 23.9 |
| 180 | 4 | 32.5 | 21.5 |
| 200 | 1 | 35.6 | 18.1 |
| 200 | 2 | 28.3 | 18.4 |
| 200 | 3 | 30.0 | 20.1 |
| 200 | 4 | 27.4 | 19.0 |

Samples of this invention exhibit a high level of wet tensile strength retention when sufficient heat treatment is applied for a sufficient time. Heating at 140 C. for a period of time longer than 4 minutes is believed to be effective in curing the composition. Temperatures from about 150 C. to 200 C. are preferred.

EXAMPLE 9
Use of Sodium Hypophosphite as Accelerator Component of Curable Aqueous Composition Preparation and testing of sample 22. A mixture of 19.0 g. polyacrylic acid of M.W.=60,000 (25% solids), 0.475 g. sodium hypophosphite monohydrate, 2.023 g. glycerol and 2.662 g. water was thoroughly mixed and poured into a flat Petri dish; the mixture was air-dried for 4–5 days, and then placed in a forced air-draft oven for 8 hours at 35 C.. The resulting film was about 40 mils in thickness. A sample weighing about 0.5 g. was cut from the film, heated as noted in Table 9.1, and then reweighed. The cured film was then soaked in water for 48 hours and weighed. A gravimetric swell ratio was determined using a correction for the soluble fraction. The method was independently found to have a 95% confidence interval of 0.60. The Swell ratio is taken as a measure of degree of curing, lower numbers indicating a higher crosslink density and therefore a greater extent of curing and greater effectiveness as a polymeric binder for heat-resistant nonwovens.

Preparation and Testing of Comparative J.

A mixture of 20.0 g. polyarylic acid of M.W.=60,000 (25% solids) and 2.13 g. glycerol was thoroughly mixed and poured into a flat Petri dish; the mixture was air-dired for 4–5 days, and then placed in a forced air-draft oven for 8 hours at 35 C. The resulting film was treated and swell ratio measured as in the testing of sample 22 herein-above.

TABLE 9.1

Effect of accelerator on swell ratio of curable aqueous composition

| Sample | Swell Ratio (Heated 6 min. at 150° C.) | (Heated 6 min. at 180° C.) |
| --- | --- | --- |
| 23 | 10.4 | 4.5 |
| Comp.J | 16.5 | 7.1 |

Sample 23 of this invention incorporating a phosphorous-containing accelerator exhibits superior curing response to Comparative J which does not contain an accelerator.

EXAMPLE 10
Use of Sodium Hypophosphite as Accelerator Component of Curable Aqueous Composition Using Various Polyols Preparation of samples 24–28 and comparative samples K–O. A mixture of polyacrylic acid of M.W.=60,000 (PAA at 25% solids), sodium hypophosphite monohydrate (SHP), polyol, and water, as indicated in Table 10.1, was thoroughly mixed and poured into a flat Petri dish; the sample was treated and tested as in Example 9. Swell ratios are presented in Table 10.2.

TABLE 10.1

Preparation of samples 24–28 and comparative samples K–O

| Sample | g. PAA | g. SHP | g. Polyol | g. water |
| --- | --- | --- | --- | --- |
| 24 | 16.0 | 0.40 | 2.95 diethylene glycol | 5.14 |
| Comp. K | 16.0 | 0 | 2.95 diethylene glycol | 0 |
| 25 | 16.0 | 0.475 | 2.05 ethylene glycol | 2.72 |
| Comp. L | 16.0 | 0 | 2.05 ethylene glycol | 0 |
| 26 | 19.0 | 0.475 | 2.84 D-gluconic acid[1] | 9.56 |
| Comp. M | 19.0 | 0 | 2.84 D-gluconic acid[1] | 9.56 |
| 27 | 19.0 | 0.475 | 2.82 β-D-lactose | 4.52 |
| Comp. N | 19.0 | 0 | 2.82 β-D-lactose | 4.52 |
| 28 | 19.0 | 0.475 | 2.82 sucrose | 4.52 |
| Comp. O | 19.0 | 0 | 2.82 sucrose | 4.52 |

[1]Added as the calcium salt.

TABLE 10.2

Effect of accelerator on swell ratio of curable aqueous compositions

| Sample | Swell Ratio (Heated 6 min. at 180° C.) |
| --- | --- |
| 24 | 4.0 |
| Comp. K | 8.3 |
| 25 | 3.5 |
| Comp. L | 5.5 |
| 26 | 14.4 |
| Comp. M | dissolved |
| 27 | 9.6 |
| Comp. N | dissolved |
| 28 | 7.6 |
| Comp. O | dissolved |

Samples 24–28 of this invention incorporating various polyols and a phosphorous-containing accelerator exhibit superior curing response to Comparatives K–O which do not contain an accelerator.

EXAMPLE 11
Effect of the Level of Polyol Component of the Curable Aqueous Composition on Curing Preparation of Samples 29–36

A mixture of polyacrylic acid of M.W.=60,000 (PAA at 25% solids), sodium hypophosphite monohydrate (SHP), and polyol, as indicated in Table 11.1, was thoroughly mixed and poured into a flat Petri dish; the sample was treated and tested as in Example 9. Swell ratios are presented in Table 11.2.

TABLE 11.1

Preparation of samples 29–36

| Sample | g. PAA | g. SHP | g. Polyol |
| --- | --- | --- | --- |
| 29 | 22.0 | 0.55 | 0.234 glycerol |
| 30 | 20.0 | 0.50 | 0.534 glycerol |
| 31 | 20.0 | 0.50 | 1.065 glycerol |
| 32 | 19.0 | 0.475 | 2.023 glycerol |
| 33 | 21.0 | 0.525 | 1.46 pVOH[1] |
| 34 | 19.0 | 0.475 | 3.30 pVOH |
| 35 | 16.5 | 0.413 | 5.73 pVOH |
| 36 | 14.0 | 0.35 | 9.72 pVOH |

[1]pVOH - poly Vinyl Alcohol used was a 25% solids content solution of Airvol 203.

TABLE 11.2

Effect of polyol level on swell ratio of curable aqueous compositions

| Sample | Hydroxyl/carboxy Ratio | Swell Ratio (Heated 6 min. at 180° C.) |
| --- | --- | --- |
| 29 | 0.1 | 9.9 |
| 30 | 0.25 | 5.4 |
| 31 | 0.5 | 7.0 |
| 32 | 1.0 | 4.5 |

TABLE 11.2-continued

Effect of polyol level on swell ratio of curable aqueous compositions

| Sample | Hydroxyl/carboxy Ratio | Swell Ratio (Heated 6 min. at 180° C.) |
|---|---|---|
| 33 | 0.1 | 14.0 |
| 34 | 0.25 | 6.8 |
| 35 | 0.5 | 4.4 |
| 36 | 1.0 | 4.5 |

Samples 29–32 and 33–36, all of this invention, incorporating different polyols and a phosphorous-containing accelerator exhibit a curing response, generally increasing, i.e., decreasing swell ratio, with increasing hydroxyl/carboxy ratio.

EXAMPLE 12
Use of Various Phosphorous-Containing Accelerators in Curable Aqueous Compositions Preparation of samples 37–40 and comparative sample P. A mixture of polyacrylic acid of M.W.=60,000 (PAA at 25% solids), accelerator, glycerol, and water, as indicated in Table 12.1, was thoroughly mixed and poured into a flat Petri dish; the sample was treated and tested as in Example 9. Swell ratios are presented in Table 12.2.

TABLE 12.1

Preparation of samples 37–40 and comparative sample P

| Sample | g. PAA | g. accelerator | g. glycerol | g. water |
|---|---|---|---|---|
| 37 | 23.0 | 0.965 $Na_4P_2O_7 \cdot 10\ H_2O$ | 2.45 | 2.83 |
| 38 | 23.0 | 0.676 $H_3PO_4$ (85%) | 2.45 | 3.12 |
| 39 | 23.0 | 0.575 $H_3PO_3$ | 2.45 | 3.22 |
| 40 | 23.0 | 0.723 $NaH_2PO_2 \cdot H_2O$ | 2.45 | 3.08 |
| Comp. P | 20.0 | 0 | 2.13 | 0 |

TABLE 12.2

Effect of accelerator type on swell ratio of curable aqueous compositions

| Sample | Swell Ratio (Heated 6 min. at 180° C.) |
|---|---|
| 37 | 5.9 |
| 38 | 2.0 |
| 39 | 2.1 |
| 40 | 4.1 |
| Comp. P | 7.1 |

Samples 37–40 of this invention incorporating various phosphorous-containing accelerators exhibit superior curing response to Comparative P which does not contain an accelerator.

EXAMPLE 13
Use of Various Polyacid Components in Curable Aqueous Compositions Preparation of Samples 41–44

A mixture of polyacid, as indicated in Table 13.1, sodium hypophosphite monohydrate (SHP) accelerator, glycerol, and water, was thoroughly mixed and poured into a flat Petri dish; the sample was treated and tested as in Example 9. Swell ratios are presented in Table 13.2; swell ratios were determined using the solvents noted, not in water.

TABLE 13.1

Preparation of samples 41–44

| Sample | g. polyacid[1] | g. SHP | g. glycerol | g. water |
|---|---|---|---|---|
| 41 | 17.0 A | 0.25 | 0.51 | 6.79 |
| 42 | 17.0 B | 0.25 | 0.53 | 7.28 |
| 43 | 17.0 C | 0.25 | 0.52 | 7.09 |
| 44 | 18.0 D | 0.19 | 0.67 | 5.01 |

[1]Polyacid A = 70 Styrene/15 Methyl methacrylate/15 Acrylic acid (25% solids)
Polyacid B = 50 Styrene/10 Hydroxyethyl methacrylate/10 Methyl methacrylate/30 Acrylic acid (25% solids)
Polyacid C = 60 Styrene/10 α-methylstyrene/30 Acrylic acid (25% solids)
Polyacid D = 70 2-Ethylhexyl Acrylate/30 Methacrylic acid (35% solids)

TABLE 13.2

Effect of polyacid type on swell ratio of curable aqueous compositions

| Sample | Swell Ratio (Heated 6 min. at 180° C.) |
|---|---|
| 41 | 8.5 (methyl ethyl ketone) |
| 42 | 5.1 (methyl ethyl ketone) |
| 43 | 7.6 (methyl ethyl ketone) |
| 44 | 5.2 (acetone) |

Samples 41–44 of this invention incorporating various polyacids exhibit curing response. All polyacid compositions taken alone rather than as part of the curable composition of this invention dissolved in the solvents used.

EXAMPLE 14
Use of Polyacrylic Acid Components of Various Molecular Weights in Curable Aqueous Compositions Preparation of samples 45–50. A mixture of polyacrylic acid (PAA), as indicated in Table 14.1, sodium hypophosphite monohydrate (SHP) accelerator, polyol, as indicated in Table 14.1, and water, was thoroughly mixed and poured into a flat Petri dish; the sample was treated and tested as in Example 9. Swell ratios are presented in Table 14.2.

TABLE 14.1

Preparation of samples 45–50

| Sample | g. PAA | g. SHP | g. polyol |
|---|---|---|---|
| 45 | 14.0 (MW = 2,000; 40% solids) | 0.56 | 2.39 glycerol |
| 46 | 19.0 (MW = 60,000; 25% solids) | 0.475 | 2.02 glycerol |
| 47 | 19.0 (MW = 190,000; 25% solids) | 0.475 | 2.02 glycerol |
| 48 | 16.0 (MW = 2,000; 40% solids) | 0.64 | 4.45 pVOH |
| 49 | 24.0 (MW = 60,000; 25% solids) | 0.60 | 4.17 pVOH |
| 50 | 24.0 (MW = 190,000; 25% solids) | 0.60 | 4.17 pVOH |

TABLE 14.2

Effect of polyacrylic acid molecular weight on swell ratio of curable aqueous compositions

| Sample | Hydroxyl/carboxy Ratio | Swell Ratio (6 min at 150° C.) | Swell Ratio (6 min. at 180° C.) |
|---|---|---|---|
| 45 | 1.0 | dissolved | 14.1 |
| 46 | 1.0 | 10.4 | 4.5 |
| 47 | 1.0 | 8.7 | 4.9 |

TABLE 14.2-continued

Effect of polyacrylic acid molecular weight on swell ratio of curable aqueous compositions

| Sample | Hydroxyl/carboxy Ratio | Swell Ratio (6 min at 150° C.) | (6 min. at 180° C.) |
|---|---|---|---|
| 48 | 0.25 | dissolved | 23.4 |
| 49 | 0.25 | 17.6 | 9.4 |
| 50 | 0.25 | 7.7 | 4.4 |

Samples 45–50 of this invention incorporating polyacrylic acid of various molecular weights exhibit curing response. Higher molecular weight polyacrylic acid and higher temperature heat treatment favored a higher cure response.

EXAMPLE 15
Use of Polyacid Components Acids Formed in the Presence of Sodium Hypophosphite in Curable Aqueous Compositions Preparation of samples 51 and comparative sample Q. A mixture of poly(66 acrylic acid/28 maleic anhydride) (polyacid; 56% solids) which was prepared in the presence of 6 wt. % sodium hypophosphite monohydrate, glycerol where indicated in Table 15.1, and water, was thoroughly mixed and poured into a flat Petri dish; the sample was treated and tested as in Example 9. Swell ratios are presented in Table 15.2.

Preparation of samples 52 and comparative sample R. A mixture of poly(82 acrylic acid/12 maleic anhydride) (polyacid; 56% solids) which was prepared in the presence of 6 wt. % sodium hypophosphite monohydrate, glycerol where indicated in Table 15.1, and water, was thoroughly mixed and poured into a flat Petri dish; the sample was treated and tested as in Example 9. Swell ratios are presented in Table 15.2.

TABLE 15.1

Preparation of samples 51–52 and comparative samples Q–R

| Sample | g. polyacid | g. water | g. polyol |
|---|---|---|---|
| 51 | 13.0 | 18.56 | 3.13 glycerol |
| Comp. Q | 13.0 | 18.56 | 0 |
| 52 | 13.0 | 18.42 | 3.02 glycerol |
| Comp. R | 13.0 | 18.42 | 0 |

TABLE 15.2

Effect of polyacid components formed in the presence of sodium hypophosphite on swell ratio of curable aqueous compositions

| Sample | Swell Ratio (Heated 6 min. at 180° C.) |
|---|---|
| 51 | 5.4 |
| Comp. Q | dissolved |
| 52 | 11.3 |
| Comp. R | dissolved |

Samples 51–52 of this invention incorporating polyacid components formed in the presence of sodium hypophosphite exhibit curing response. Comparatives Q–R demonstrate that the corresponding polyacid components formed in the presence of sodium hypophosphite do not cure in the absence of a polyol under the conditions employed.

EXAMPLE 16
Use of Various Hydroxylamines as the Polyol Component in Curable Aqueous Compositions
Preparation of Samples 53–57

A mixture of polyacrylic acid (45% solids content) of M.W.=10,000 having the carboxylic acid groups therein neutralized to an extent of 1.9% with sodium hydroxide (fixed base) and and to an additional extent of 5.3% with ammonium hydroxide (volatile base) at a pH=3.5, sodium hypophosphite monohydrate (3.3% solution) accelerator, polyolol, and water, as indicated in Table 16.1, the amoount selected to yield a total solids level of about 18%, was thoroughly mixed and applied to a wet formed fiberglass sheet according to the method of Example 3. This sheet, after vacuuming to remove excess binder composition, was heated for three minutes at 200 C.; the sample was tested as in Example 3. Tensile strength results are presented in Table 16.2. Further, samples were tested at lower temperatures as well. Tensile strenth results are presented in Table 16.3

Table 16.1 Preparation of Samples 53–57

| Sample | g. PAA | g. accelerator | g. polyolol[1] | g. water |
|---|---|---|---|---|
| 53 | 104.6 | 2.1 | 6.1 P1 | 187.2 |
| 54 | 107.2 | 2.1 | 4.6 P2 | 186.1 |
| 55 | 102.5 | 2.1 | 6.3 P3 | 189.1 |
| 56 | 108.3 | 2.1 | 4.1 P4 | 185.5 |
| 57 | 103.6 | 2.1 | 4.7 P5 | 189.7 |

[1]Polyols are: P1 = diisopropanolamine; P2 = 2-(2-aminoethylamino) ethanol; P3 = triethanolamine; P4 = tris(hydroxymethyl)aminomethane; P5 = diethanolamine.

TABLE 16.2

Tensile Test Results of Treated Nonwovens Heated at 200° C.

| Sample | Dry Tensile Strength (lb./in.) | Wet Tensile Strength (lb./in.) |
|---|---|---|
| 53 | 41.0 | 29.2 |
| 54 | 41.5 | 28.5 |
| 55 | 47.8 | 28.5 |
| 56 | 42.0 | 21.7 |
| 57 | 41.2 | 28.9 |

TABLE 16.3

Tensile Test Results of Treated Nonwovens Heated at Various Temperatures

| | Tensile Strength (lb./in.) | | | | | | | |
|---|---|---|---|---|---|---|---|---|
| | Dry | | | | Wet | | | |
| Sample | 170° C. | 180° C. | 190° C. | 200° C. | 170° C. | 180° C. | 190° C. | 200° C. |
| 53 | — | 44.7 | 46.2 | 41.0 | 3.5 | 18.6 | 23.0 | 29.2 |
| 54 | — | 55.0 | — | — | — | 16.7 | — | 28.5 |
| 55 | 39.2 | 46.7 | — | 47.8 | 4.2 | 19.3 | — | 31.5 |
| 56 | — | 41.1 | — | 42.0 | — | 5.1 | — | 21.7 |
| 57 | 43.8 | 48.6 | — | 41.2 | 4.0 | 14.3 | — | 28.9 |

Samples 53–57 of this invention which incorporate a hydroxylamine as the polyol component impart a useful level of tensile strength.

EXAMPLE 17
Use of a Diamine in Place of the Polyol Component
Preparation of Sample 58

A mixture of 101.1 g. polyacrylic acid (45% total solids) of M.W.=10,000 having the carboxylic acid groups therein neutralized to an extent of 1.9% with sodium hydroxide (fixed base) and and to an additional extent of 5.3% with ammonium hydroxide (volatile base) at a pH=3.5, 2.1 g. sodium hypophosphite monohydrate (3.3% solution) accelerator, 7.4 g. hexanediamine, and 189.4 g. water was thoroughly mixed and applied to a wet formed fiberglass sheet according to the method of Example 3. This sheet, after vacuuming to remove excess binder composition, was heated for three minutes at 200 C.; the sample was tested as in Example 3. Dry tensile strength was 48.8 lb./inch and wet tensile strength was 19.6 lb./inch.

EXAMPLE 18
Use of Triethanolamine as a Polyol Component with Polyacrylic Acid Terminated with Phosphinate Groups
Preparation of Sample 59

A mixture of 87.5 g. polyacrylic acid terminated with phosphinate groups prepared according to the method of sample 51 (at 53.1% solids content) of M.W.=3500 having the carboxylic acid groups therein neutralized to an extent of 1.0% with sodium hydroxide (fixed base), 14.2 g. triethanolamine, and 198.3 g. water was thoroughly mixed and applied to a wet formed fiberglass sheet according to the method of Example 3, except that the fiberglass was ¾ inch long. This sheet, after vacuuming to remove excess binder composition, was heated for three minutes at 200 C.; the sample was tested as in Example 3. Dry tensile strength was 35.5 lb./inch and wet tensile strength was 24.5 lb./inch.

What is claimed is:

1. A curable aqueous composition comprising
   (a) a polyacid containing at least two carboxylic acid groups, anhydride groups, or salts thereof;
   (b) a polyol containing at least two hydroxyl groups; and
   (c) a phosphorous-containing accelerator;
   wherein the ratio of the number of equivalents of said carboxylic acid groups, anhydride groups, or salts thereof to the number of equivalents of said hydroxyl groups is from about 1/0.2 to about 1/1, and wherein said carboxylic acid groups, anhydride groups, or salts thereof are neutralized to an extent of less than about 35% with a fixed base.

2. The curable aqueous composition of claim 1 wherein said polyacid is a polymeric polyacid.

3. The curable aqueous composition of claim 2 wherein said polymeric polyacid is an addition polymer.

4. The curable aqueous composition of claim 1 wherein said polyol is a compound with a molecular weight less than about 1000 bearing at least two hydroxyl groups.

* * * * *